UNITED STATES PATENT OFFICE.

HARRY McCORMACK, OF CHICAGO, ILLINOIS, AND EARLE W. McMULLEN, OF KENOSHA, WISCONSIN, ASSIGNORS OF ONE-FOURTH TO FRANK ORTH AND ONE-FOURTH TO JAMES HARBAUGH, BOTH OF INDIANA HARBOR, INDIANA.

PROCESS FOR THE MANUFACTURE OF PAPER-PULP AND THE LIKE.

1,196,708. Specification of Letters Patent. Patented Aug. 29, 1916.

No Drawing. Application filed November 25, 1914. Serial No. 873,945.

*To all whom it may concern:*

Be it known that we, HARRY McCORMACK, of Chicago, Cook county, Illinois, and EARLE W. McMULLEN, of Kenosha, Kenosha county, Wisconsin, both citizens of the United States, have invented a certain new and useful Process for the Manufacture of Paper-Pulp and the like, of which the following is a specification.

The present invention has reference to a process for the treatment of plants which contain cellulose, for the manufacture of paper pulp and the like.

The process to which the present invention relates is intended particularly for the treatment of such raw materials as sunflower stalks and the like, although it will presently appear that the process can be applied with equal advantage to the treatment of certain other raw materials.

In the manufacture of paper pulp the raw cellulose material must be subjected to a disintegrating treatment or action which will liberate and separate the cellulose fibers without destroying or injuring their structure for the purpose intended. This disintegrating action is generally secured by the combined effects of heat and pressure, and the solvent action of a suitable liquor. The cellulose fibers are bound together by intermediate materials which are generally removed by a solvent action, and this solvent action is dependent upon the chemical properties of the liquor, as well as the temperature and pressure at which the action is carried forward.

The physical structure of the cellulose depends upon the nature of the plant growth which produces it. That is to say the cellulose of the wood fibers differs from that of the fibers of other plants, such, for example, as sunflower stalks. These are all properly to be classed as cellulose, but their strength and ability to resist chemical solvents, and other disintegrating actions, depends upon the nature of the plant structure which produces them. It is, therefore, found by experience that if raw materials of the general nature of sunflower stalks be subjected to the same action as is used in the treatment of woody structures, the cellulose will, itself, be dissolved or broken up to such an extent that a very substantial loss of cellulose material will ensue.

The disclosures of the present invention have reference to a treatment whereby fibrous material of the general nature of sunflower stalks can be successfully treated for the manufacture of paper pulp.

In carrying on the ordinary process, it is customary to use a liquor which is strongly alkaline, and for this purpose use is ordinarily made of the hydroxid of the alkalis or alkaline earths. The raw material is then boiled in such a solution for the proper length of time under a pressure which generally averages in the neighborhood of one hundred twenty pounds per square inch. The treatment is continued until the soluble materials have been taken up. If such materials as sunflower stalk and the like be subjected to this same treatment the powerful alkali will hydrolyze the cellulose, thereby dissolving it and thus destroying its usefulness for the purpose intended. On the other hand, in the present case we have discovered that if a weak alkaline solution be used, and if the boiling action be carried forward under a pressure ordinarily not higher than ninety pounds per square inch, the cellulose will not be hydrolyzed, and a thoroughly satisfactory pulp may be produced. For this purpose we have discovered that it is preferable to use a carbonate as the alkaline material.

We have also discovered the fact that it is desirable to use in the liquor one or more neutral salts in addition to the alkali. These neutral salts probably serve to raise the boiling point of the liquor above that which would occur at the desired pressure, so that it is possible for us to attain the advantage of a high boiling temperature combined with the advantages of a low retort pressure.

As an example of a suitable solution or liquor the following constituents and proportions may be mentioned:

NaOH -------- 5% of weight of stalks used.
$Na_2CO_3$ ------- 10%  "    "    "    "    "
NaCl -------- 8%  "    "    "    "    "
NaOCl------- 25%  "    "    "    "    "

Of the constituents above enumerated the sodium hydroxid and the sodium carbonate are alkaline in nature, while the sodium chlorid and the sodium oxy-chlorid are neutral in nature. It thus appears that in the particular example illustrated the alkaline salts constitute somewhat over fifty per cent. of the weight of the neutral salts.

In carrying into effect the process of the present invention where a liquor having the above constituents is used, the sunflower stalks, if these be the raw material, may be cut when they are fresh and green, a few weeks before they begin to dry out. They may then be dried in a steam heated closet or the like, and when dry may be shredded. The shredded material will then be cooked in a liquor containing the constituents previously enumerated. This will be done in a steam heated kettle at a pressure of from seventy to ninety pounds per square inch. The cooking will ordinarily be accomplished in ten hours or thereabout.

The cooked material may be beaten in a pebble-mill until the fibers are thoroughly separated. For this purpose the stalks placed in the mill may be from five to ten per cent. by volume of the pebbles. The jar may be filled approximately one third full with pebbles, and enough water added to cover the pebbles and the stalks. Ordinarily the beating will be accomplished in two hours or thereabout.

The resulting pulp will be found very satisfactory and desirable for use in the manufacture of brown papers and the like, such as wrapping paper and craft paper. If it be desired to bleach the pulp, this may be done, but we have discovered the fact that the ordinary bleaching agents will generally decompose or destroy the cellulose, and that, therefore, a special form of bleaching agent should be used. It is usual to employ chlorin gas as the bleaching agent, but as before stated, this will ordinarily destroy the fibrous structure of paper pulp made from sunflower stalks and the like. We have, however, discovered that potassium permanganate ($KMnO_4$) can be satisfactorily used as a bleaching agent for this pulp. For this purpose the desired quantity of bleaching agent is preferably added to the water in the pebble mill after the beating has proceeded for a sufficient length of time to partially break up the fibrous material.

While we have herein described the application of our process, and the application of its principles to the manufacture of the paper pulp from sunflower stalks and the like, it will, nevertheless, be understood that these principles are equally applicable to the treatment of many other forms of plant growth in which the cellulose is similar in structure and composition to the cellulose of the sunflower stalk.

We claim:

1. The process for the treatment of cellulose material for the production of paper pulp, which consists in drying sun flower stalks or the like, shredding the dried material, cooking the shredded material in a solution consisting substantially of sodium hydroxid, sodium carbonate, sodium chlorid, and sodium oxy-chlorid, the sodium hydroxid, sodium carbonate, sodium chlorid, and sodium oxy-chlorid being substantially in respective percentages of 5, 10, 8 and 25 by weight of the sun flower stalk, and which consists in carrying forward the cooking action in such solution under a pressure of substantially 80 pounds per square inch, for a period of substantially 10 hours, and which consists in subsequently beating the cooked material in a pebble mill or the like, substantially as described.

2. The process for the treatment of cellulose material to produce paper pulp, which consists in drying the raw cellulose material, shredding the same, cooking the dried and shredded material, and subsequently beating the cooked material in a pebble mill or the like, the cooking solution comprising essentially sodium hydroxid, sodium carbonate, sodium chlorid, and sodium oxy-chlorid, substantially in the respective percentages of 5, 10, 8 and 25 as compared to the weight of the cellulose material undergoing treatment, substantially as described.

3. The process for the treatment of cellulose material to produce paper pulp which consists essentially in drying and shredding the raw material, and cooking the dried and shredded material in a solution consisting essentially of sodium hydroxid, sodium carbonate, sodium chlorid, and sodium oxychlorid or the equivalent at a pressure of 90 pounds per square inch or less for the desired period of time, substantially as described.

4. The process for the treatment of cellulose material for the production of paper pulp which consists in drying and shredding the material, and cooking the same in a solution consisting essentially of sodium hydroxid, sodium carbonate, sodium chlorid, and sodium oxy-chlorid for a suitable length of time at a suitable pressure, and subsequently beating the cooked material in a pebble mill or the like containing water having potassium permanganate in solution, substantially as described.

5. The process for the treatment of cellulose material to produce paper pulp which consists in drying and shredding the raw cellulose material, and cooking the dried and shredded material in a solution of alkaline salts and neutral salts, the cooking process being carried forward at a pressure of substantially 80 pounds per square inch, substantially as described.

6. The process for the treatment of cellulose material to produce paper pulp which consists essentially in cooking the cellulose material in a solution containing sodium hydroxid, sodium carbonate, sodium chlorid, and sodium oxy-chlorid, or the equivalent of said salts, at a pressure of 90 pounds per square inch or less for the desired period of time, substantially as described.

7. The process for the treatment of cellulose material for the production of paper pulp which consists in cooking said material in a solution containing sodium hydroxid, sodium carbonate, sodium chlorid, and sodium oxy-chlorid or the equivalent of said salts for a suitable length of time at a suitable pressure, and subsequently treating the cooked material with a solution containing potassium permanganate, substantially as described.

8. The process for the treatment of cellulose material to produce paper pulp which consists in cooking said material in a solution containing sodium hydroxid, sodium carbonate, sodium chlorid, and sodium oxy-chlorid substantially in the respective percentages of 5, 10, 8, and 25 as compared to the weight of the cellulose material undergoing treatment, or a solution equivalent to said solution, substantially as described.

HARRY McCORMACK.
EARLE W. McMULLEN.

Witnesses for Harry McCormack:
H. B. PULSIFER,
H. M. RAYMOND.

Witnesses for Earle W. McMullen:
GUS JACOB,
J. H. CANTWELL.